June 30, 1959     W. E. WATERS     2,892,957

MICROWAVE DETECTOR

Filed May 27, 1957

INVENTOR
WILLIAM E. WATERS

BY

United States Patent Office 2,892,957
Patented June 30, 1959

---

2,892,957

MICROWAVE DETECTOR

William E. Waters, Kensington, Md., assignor to the United States of America as represented by the Secretary of the Army Application May 27, 1957, Serial No. 661,977

1 Claim. (Cl. 315—5.19)

(Granted under Title 35, U.S. Code (1952), sec. 266)

The invention described herein may be manufactured and used by or for the Government for governmental purposes without the payment to me of any royalty thereon.

This invention relates to microwave detectors in general and more particularly to a new type of microwave detector which obtains detection by velocity modulating an electron beam.

A radar set or other microwave transmitting and receiving system ordinarily uses a crystal detector to detect the incoming microwave signal. Because of the low power capabilities of such crystal detectors it is necessary to use a so-called T-R tube ahead of the crystal to protect the crystal from the high power transmitter signal. This invention provides a new type of microwave detector which will not be damaged by even fairly large amounts of power leaking from the transmitter. It becomes possible therefore to eliminate the T-R tube and bring about a considerable simplification of conventional transmitting and receiving systems.

A further disadvantage of conventional crystal detectors is that they are fragile and will operate reliably only over a relatively restricted temperature range. The microwave detector of this invention overcomes this problem because it can be ruggedly constructed in the same way as a microwave tube and will operate over a wide temperature range.

An object of this invention is to provide a new and improved microwave detector.

Another object is to provide a sensitive microwave detector which will operate over a wide temperature range, can be made mechanically rugged, and will not be damaged by large pulses of microwave power.

A further object is to provide a highly sensitive microwave detector.

Still another object of this invention is to provide a method for operating a conventional reflex klystron as a microwave detector.

The specific nature of the invention, as well as other objects, uses, and advantages thereof, will clearly appear from the following description and from the accompanying drawing, in which.

Figures 1, 2:
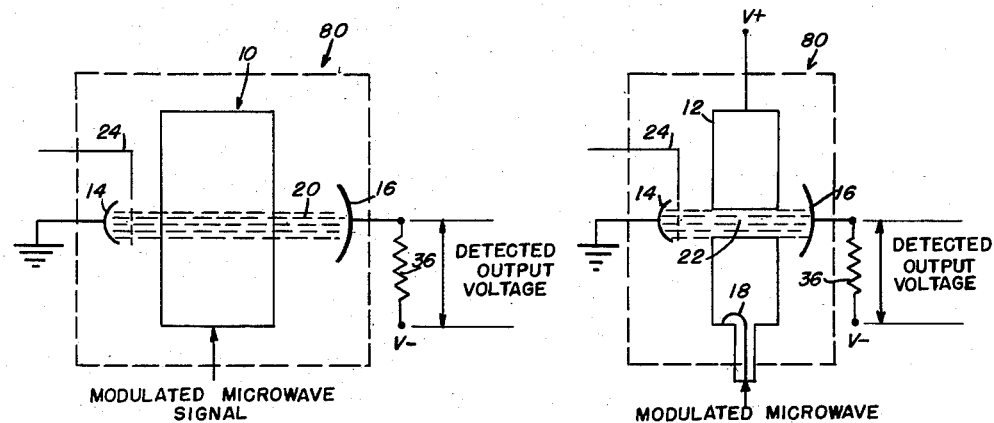
Figure 1 is a schematic representation of a microwave detector in accordance with the invention.
Figure 2 is a schematic representation of the microwave detector of Figure 1 using cavity-type velocity modulation means.

A microwave detector in accordance with the invention is illustrated in Figure 1. The dashed line represents an evacuated envelope 80. A stream of electrons emitted by a cathode 14 are focused and accelerated into an electron beam 20 by means of an electron gun 24. These electrons pass through velocity modulating means 10 which velocity modulates the electron beam 20 in response to a microwave signal applied to the means 10. After passing through the means 10, the electron beam 20 travels towards the repeller 16. With no microwave signal applied, there is no velocity modulation of the electrons. For this condition the repeller 16 is adjusted to have a negative value which just cuts-off repeller current; that is, the repeller voltage is just enough negative so that practically all of the electrons which approach the repeller 16 are reflected back and never reach the repeller 16. If a microwave signal is now applied to the velocity modulating means 10, the electron beam 20 will be velocity modulated in accordance with the microwave signal. Those electrons which are accelerated the most will strike the repeller 16 causing a repeller current. The magnitude of the repeller current will change as the magnitude of the microwave input signal changes. A larger microwave input signal will cause more electrons to reach the repeller 16, and a smaller microwave input signal will cause less electrons to reach the repeller 16. The repeller current will thus be dependent upon the magnitude of the applied microwave signal. Application of a modulating microwave signal therefore will produce a repeller current which varies in accordance with the modulation of the signal. A resistor 36 external to the envelope 80 is placed in series with the repeller 16 to transform repeller current variations into an A.-C. voltage which may then be applied to a conventional amplifier.

It should be noted that it is not necessary to critically adjust the repeller voltage V—. It has been found that maximum detection sensitivity is obtained for the condition where the repeller current is just cut-off but such a condition is not essential to the operation of Figure 1 as a microwave detector. If the repeller voltage V— is less negative than the cut-off value there will merely be an initial value of repeller current with no signal applied. With an applied microwave signal, operation will be the same as described previously, but with reduced sensitivity because there are now fewer electrons which can be made to hit the repeller 16. If the repeller voltage V— is more negative than the cut-off value, a repeller current will be obtained only when the input microwave signal has a magnitude above a certain level determined by the amount that the repeller voltage V— is more negative than cut-off. Such a condition is not desirable because a greater applied microwave signal is necessary.

In operating the microwave detector of Figure 1 it is important to adjust the beam current and the repeller voltage V— so that oscillation does not occur. Those in the art will readily be able to provide the desired no-signal operating condition.

Figure 2 shows the use of cavity-type velocity modulation means for the velocity modulation means 10 of Figure 1. In Figure 2 a resonant cavity 12 having a gap 22 serves to velocity modulate the electrons in much the same way as in a klystrom amplifier. The cavity 12 also serves as an anode and is connected to a voltage V+. The modulated microwave signal is injected into the cavity 12 by a one turn coupling loop 18 so that the cavity 12 becomes excited and produces an R-F voltage across the gap 22 which velocity modulates the beam 20. In order to excite the cavity 12 it is important that the applied microwave frequency be close to the resonant frequency of the cavity 12. This is analogous to the necessity of having the frequency of the microwave signal applied to a klystron amplifier close to the resonant frequency of the buncher cavity to which it is applied. Application of a microwave signal to the coupling loop 18 excites the cavity 12 causing an R-F voltage to appear across the gap 22. This R-F voltage velocity modulates the electron beam 20. Operation is then as described in connection with Figure 1. By using a small beam current 20, a gridless gap can be used for the cavity 12 and such a gap will greatly reduce equipartition noise.

It may be noted that the diagram of Figure 2 resembles a conventional reflex klystron. It is evident however, that although the two devices have similar elements, the cooperation between the elements and the results obtained are very different. Because of the structural resemblance, though, it is possible to operate a reflex klystron as a microwave detector. This may be accomplished by adjusting the repeller voltage and the beam current of the reflex klystron so that the klystron is not oscillating and so that a portion of the electrons which travel towards the repeller are reflected back and never reach the repeller. For maximum sensitivity the repeller voltage should be adjusted to approximately repeller current cut-off. It the microwave signal to be detected is applied to the oscillator output terminal of the klystron, the repeller current will vary in accordance with the modulation of the applied microwave signal. To transform the repeller current variations into an a A.-C. voltage a resistor may be incorporated in series with the repeller. Operated in this way the reflex klystron actually loses its identity since it does not perform its intended function of providing microwave oscillations.

To detect very small microwave signals it is necessary that the velocity modulation means 10 in Figure 1 produce velocity modulation of the electron beam 20 even for small microwave signals applied to the means 10. This may be accomplished by incorporating microwave amplifying means in the velocity modulation means 10.

Figure 3:
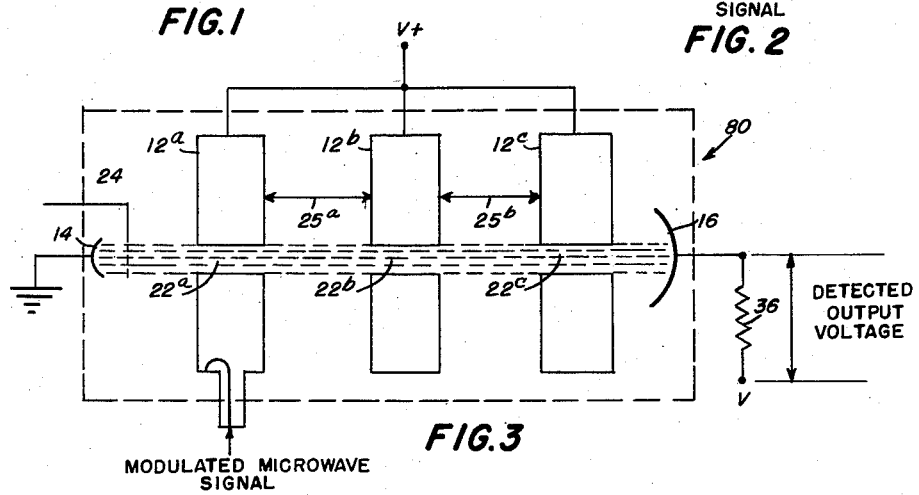
Figure 3 is a schematic representation of the microwave detector of Figure 1 using multi-cavity velocity modulation means.

Figure 3 shows how this may be accomplished using a plurality of cavities as the velocity modulation means 10 of Figure 1 rather than the single cavity 12 as in Figure 2. Figure 3 illustrates the use of three cavities 12a, 12b, and 12c. The tuning of these cavities and the length of the drift spaces 25a and 25b are adjusted as in a conventional multi-cavity klystron amplifier so that each successive cavity acts to further velocity modulate the electron beam 20. The resultant velocity modulation is considerably greater than is obtained with a single cavity. Using the multi-cavity velocity modulation means of Figure 3, therefore, it is possible to provide a highly-sensitive microwave detector. If so desired additional cavities may be used to increase the detection sensitivity. It is also possible to increase the bandwidth of these multi-cavity velocity modulation means by employing additional intermediate cavities that are appropriately detuned. This expedient is used in conventional power klystrons designed for television service.

Figure 4:
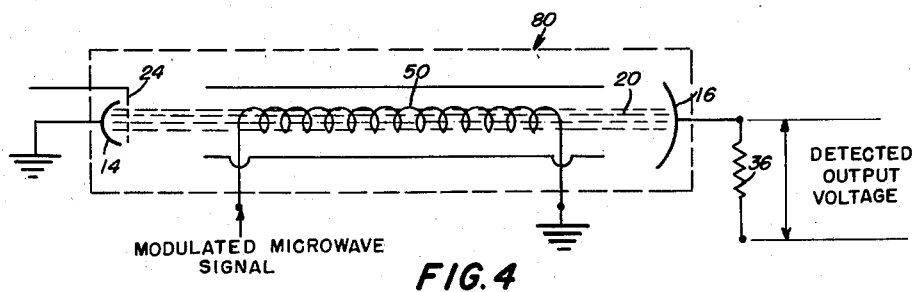
Figure 4 is a schematic representation of the microwave detector of Figure 1 using travelling-wave velocity modulation means.

Figure 4 shows how typical travelling-wave structure can be used for the velocity modulation means 10 of Figure 1 as an alternative to the cavity means illustrated in Figures 2 and 3. The applied microwave signal propagates around the turns of the helix 50 and velocity modulation of the electron beam 20 occurs gradually as the electron beam 20 passes through the helix 50. Because the travelling-wave structure provides an amplifying effect, considerable velocity modulation of the electron beam 20 is obtained even for small applied microwave signals. An advantage of using travelling-wave structure for the velocity modulation means 10 is that velocity modulation of the electron beam 20 will be obtained for a wide frequency range of applied microwave signal. This is the case because travelling-wave structure is inherently non-resonant. Cavity-type velocity modulation means on the other hand produce velocity modulation only for the limited frequency range which excites the cavity.

The microwave detector of this invention can be used in any type of system where microwave detection is desired. If incorporated into a radar system no protecting T-R tube will be needed since this microwave detector will not be damaged by large amounts of input power. Furthermore because of the high detection sensitivity possible the gain requirements of the receiver can be reduced considerably.

It will be apparent that the embodiment shown is only exemplary and that various modifications can be made in construction and arrangement within the scope of the invention as defined in the appended claim.

I claim:

A microwave detector comprising in combination: an evacuated envelope, a heated cathode in said envelope for providing a source of electrons, electron gun means for accelerating and focusing said electrons into an electron beam, said envelope comprising only one resonant cavity having only one gap formed within said envelope through which said beam is passed, means for applying the microwave signal to be detected to said cavity so that said cavity becomes excited and produces an R.-F. voltage across said gap which velocity modulates said beam, a repeller electrode in said envelope located so that said beam travels towards said repeller electrode after leaving said gap, means applying a negative voltage to said repeller electrode such that with no microwave signal applied to said cavity a substantial portion of the electrons in said beam are reflected back towards said gap and never reach said repeller electrode, the beam current and the negative voltage on said repeller electrode further being adjusted so that oscillation does not occur before or after the microwave signal is applied to said cavity, the application of said microwave signal to said cavity thereby producing a repeller current which varies in accordance with the modulation of said signal, and an impedance in series with said repeller electrode for transforming the variations in the repeller current to an A.-C. voltage.

References Cited in the file of this patent

UNITED STATES PATENTS

| | | |
|---|---|---|
| 2,406,370 | Hansen et al. | Aug. 27, 1946 |
| 2,702,349 | McArthur | Feb. 15, 1955 |